(12) United States Patent
Kim et al.

(10) Patent No.: US 9,286,343 B2
(45) Date of Patent: Mar. 15, 2016

(54) STATISTICS MECHANISMS IN MULTITENANT DATABASE ENVIRONMENTS

(71) Applicant: salesforce.com, inc., San Francisco, CA (US)

(72) Inventors: Hoon Kim, Redwood City, CA (US); Jesse Collins, Berkeley, CA (US); Chirag Rajan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 200 days.

(21) Appl. No.: 13/925,064

(22) Filed: Jun. 24, 2013

(65) Prior Publication Data

US 2014/0012817 A1    Jan. 9, 2014

Related U.S. Application Data

(60) Provisional application No. 61/667,504, filed on Jul. 3, 2012.

(51) Int. Cl.
*G06F 17/00* (2006.01)
*G06F 17/30* (2006.01)

(52) U.S. Cl.
CPC .............................. *G06F 17/30371* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |

(Continued)

OTHER PUBLICATIONS

Chaudhuri et al, "Automating Statistics Management for Query Optimizers", 2000.*

(Continued)

*Primary Examiner* — Hung Le
(74) *Attorney, Agent, or Firm* — Blakely, Sokoloff, Taylor & Zafman

(57) ABSTRACT

Statistics mechanisms in multitenant database environments. A master statistics file is maintained in a multitenant database system. The master statistics file has statistics corresponding to multiple tenants within the multitenant database system. Statistics for a selected table within the multitenant database system are generated. The selected table corresponding to a selected tenant of the multitenant database system. The master statistics file is updated based on the generated statistics for the selected table.

18 Claims, 4 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp |
| 6,363,371 B1 * | 3/2002 | Chaudhuri et al. ............... 1/1 |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,847,978 B2 * | 1/2005 | Ellis ............... G06F 17/30463 707/713 |
| 6,850,895 B2 | 2/2005 | Brodersen et al. |
| 6,850,949 B2 | 2/2005 | Warner et al. |
| 7,340,411 B2 | 3/2008 | Cook |
| 7,340,650 B2 * | 3/2008 | Westmacott ............... 714/38.14 |
| 7,620,655 B2 | 11/2009 | Larsson et al. |
| 7,783,625 B2 * | 8/2010 | Simmen ............ G06F 17/30463 707/713 |
| 8,340,423 B1 * | 12/2012 | Zelinka ............... G06T 3/4038 382/173 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0243555 A1 * | 12/2004 | Bolsius et al. ............... 707/3 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0234900 A1 * | 10/2005 | Bossman et al. ............... 707/4 |
| 2006/0294058 A1 * | 12/2006 | Zabback ............ G06F 17/30536 |
| 2008/0133454 A1 * | 6/2008 | Markl et al. ............... 707/2 |
| 2008/0195577 A1 * | 8/2008 | Fan ............... G06F 17/30469 |
| 2008/0275840 A1 * | 11/2008 | Burger et al. ............... 707/2 |
| 2009/0063398 A1 * | 3/2009 | Bhatia et al. ............... 707/2 |
| 2009/0216701 A1 * | 8/2009 | Bjorner ............ G06N 5/02 706/47 |
| 2009/0281985 A1 * | 11/2009 | Aggarwal ............... 707/2 |
| 2010/0174701 A1 * | 7/2010 | Burger ............ G06F 17/30312 707/713 |
| 2010/0185714 A1 * | 7/2010 | Gerber et al. ............... 707/966 |
| 2011/0022581 A1 * | 1/2011 | Korlapati ............... 707/713 |
| 2011/0258179 A1 * | 10/2011 | Weissman et al. ............... 707/714 |

OTHER PUBLICATIONS

Chang et al, "BigTable: A Distributed Storage System for Structured Data", 2006.*

* cited by examiner

STATISTICS MECHANISMS IN MULTITENANT DATABASE ENVIRONMENTS

PRIORITY AND RELATED APPLICATION DATA

This application claims priority to Provisional U.S. Patent App. No. 61/667,504, filed on Jul. 3, 2012, entitled "Automatic Oracle Statistics Generation," which is incorporated herein by reference in its entirety and for all purposes.

TECHNICAL FIELD

Embodiments relate to multitenant database environments. More particularly, embodiments relate to mechanisms for automatic generation of database statistical information within a multitenant database environment.

BACKGROUND

Databases are commonly used tools for maintaining and tracking data. For example, The Oracle Database (commonly referred to as Oracle RDBMS) is an object-relational database management system produced and marketed by Oracle Corporation. These databases generally have mechanisms to gather statistical information. However, the statistics mechanisms may not be sufficient or useful in a multitenant database system.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

In a multitenant environment, automatically creating statistics can avoid many unnecessary communications across an organization by providing estimates of table sizes and/or other information. Schema requesters can operate more efficiently when they have better information regarding the size of tables. In one embodiment, an Oracle database can be utilized. In alternate embodiments, other databases can be utilized, but the examples that follow are generally related to Oracle databases. Other databases can be supported with corresponding techniques/operations.

The example that follows includes details specific to Oracle databases; however, the techniques described herein are not limited to use with Oracle databases. In one embodiment, the multitenant database management system parses the statistics file provided by the database (e.g., OracleStats.xml) into a SortedMap. A SortedMap is a Map (i.e., an object that maps keys to values and cannot contain duplicate keys; each key can map to at most one value) that maintains its entries in ascending order, sorted according to the keys' natural ordering, or according to a Comparator provided at the time of the SortedMap creation.

Statistics values are generated for the table with the number of rows, for example, input from a command line or other source. New statistics for the table that have been generated are inserted in the SortedMap. The statistics file (e.g., OracleStats.xml) is rewritten and the difference between the old version and the new version exists only for the table generated with the number of rows. The updated statistics can then be used. In one embodiment, the statistics file can be reviewed and/or checked prior to use.

Statistics generation in a multitenant database system is described in greater detail below. Traditional database statistical mechanisms are not effective in a multitenant database environment for many reasons. For example, traditional database statistics mechanisms do not provide analysis of a live stream of data and may not be consistent across multiple instances. Some organizations, for example, a call center, may require consistently up to date data, which may not be possible using traditional techniques.

Figure 1:
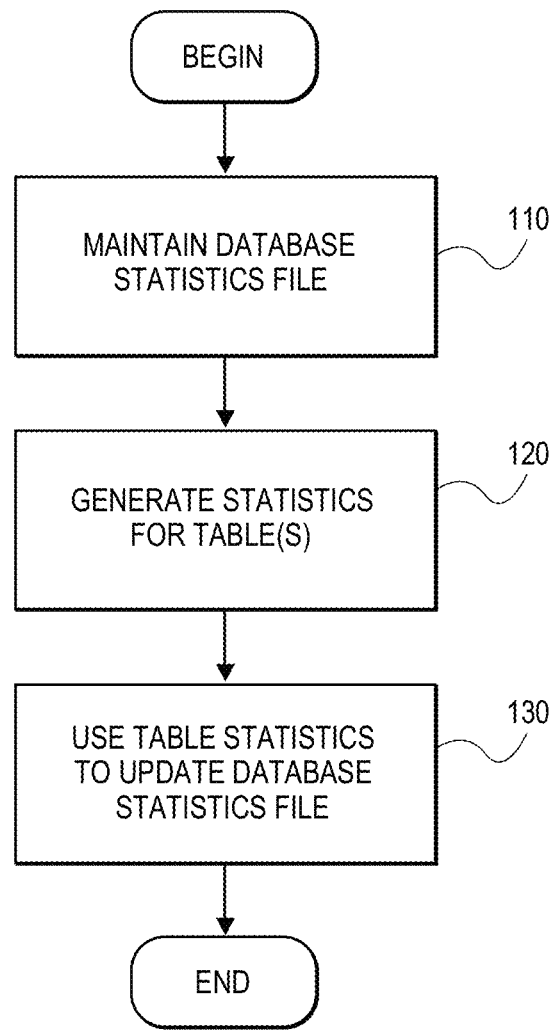
FIG. 1 is a flow diagram of one embodiment of a technique for generating statistics to be used in a multitenant database environment.

FIG. 1 is a flow diagram of one embodiment of a technique for generating statistics to be used in a multitenant database environment. The example of FIG. 1 includes references to specific products and applications; however, comparable functionality can be provided in a different manner.

One or more database statistics files are maintained, 110. In one embodiment, a Gold XML file is maintained in Perforce that can be used to synchronize the database statistics file (e.g., OracleStats.xml) with a latest version for the main branch.

Statistics are generated for one or more tables in the multitenant database system, 120. In one embodiment, the database statistics file can be parsed to obtain table statistics. Additional statistics can be generated for one or more selected tables. Alternatively, all statistical information can be generated.

In one embodiment, a total number of rows in the selected table, a number of disk blocks the selected table uses, and/or an average length of rows in the selected table can be determined. In one embodiment, a number of rows in an index, a number of leaf blocks for the index, and/or a number of distinct keys for the index can be determined.

In one embodiment, the statistics include an average number of leaf blocks per key, an average number of data blocks per key, a clustering factor, and/or a B-tree level can be determined for the selected table. In one embodiment, the statistics include a number of distinct keys for one or more columns within the selected table, a number of nulls in the one or more columns within the selected table, and/or an average column length for the selected table. In one embodiment, the statistics include a highest value for one or more columns within the selected table, and/or a lowest value for one or more columns within the selected table.

The table statistics are then used to update the database statistics file(s), 130. In one embodiment, Perforce may be used to synchronize the table statistics with the database statistical file. In one embodiment, the table statistics may be reviewed and/or pre-checked prior to updating the database statistical file.

In one embodiment, if the database statistical file contains any statistics for the targeted table(s), related indexes and/or related columns, the system will not change any existing values in the database statistical file except for the number of blocks and the number of average row length in the table statistics in order to not cause regression in the database statistical file.

In one embodiment, the following formulas can be utilized for analyzing Oracle Statistics values. In alternate embodiments, other databases may have different commands and/or variable that can be utilized to determine comparable table statistics. Thus, the examples that follow are for illustration purposes.

Oracle Statistics for a Table
Number of Rows: Given by a developer who requests schema change.
Number of Average Row Length: Sum of Average Column Lengths for this table.
Number of Blocks: Ceiling[Number of Rows/Ceiling (BLOCK_SIZE/Average Row Length)] where BLOCK_SIZE is Oracle block size set in SPFile.
Oracle Statistics for an Index
Primary Key Index (Unique Index)
B-level: Floor($Log_{100}$ Number of Rows) Note: $Log_{100}$ means Log base 100)
Number of Distinct Keys: Same with Number of Rows for the Table Number of Leaf Blocks:

$$Ceiling([Number\ of\ Rows/Ceiling\{BLOCK\_SIZE/ \\ (Sum\ of\ related\ columns'\ Average\ Column \\ Length+22)\}]*1.5)$$

where BLOCK_SIZE is Oracle block size set in SPFile.
Average Leaf Blocks per Key: 1
Average Data Blocks per Key: 1 (As unique index)
Clustering Factor Number of Rows*0.15 (15% of number of rows)
Number of Rows: Given by a developer who requests schema change. (Same with Number of Rows in Table Statistics)
Alternate Key Index (Unique Index)
B-level: Floor($Log_{100}$ Number of Rows) Note: $Log_{100}$ means Log base 100)
Number of Distinct Keys: Same with Number of Rows for the Table Number of Leaf Blocks:

$$Ceiling([Number\ of\ Rows/Ceiling\{BLOCK\_SIZE/ \\ (Sum\ of\ related\ columns'\ Average\ Column \\ Length+22)\}]*1.5)$$

where BLOCK_SIZE is Oracle block size set in SPFile.
Average Leaf Blocks per Key: 1
Average Data Blocks per Key: 1 (As unique index)
Clustering Factor Number of Rows*0.3 (30% of number of rows)
Number of Rows: Given by a developer who requests schema change. (Same with Number of Rows in Table Statistics)
Inversion Entry Index (Non-Unique Index)—for Most Cases Except for Below Two IE Index Types
B-Level:
  Floor($Log_{100}$ Number of Rows) Note: $Log_{100}$ means Log base 100)
Number of Distinct Keys: Number of Rows*Selectivity
Number of Leaf Blocks:

$$Ceiling([Number\ of\ Rows/Ceiling\{BLOCK\_SIZE/ \\ (Sum\ of\ related\ columns'\ Average\ Column \\ Length+22)\}]*1.5)$$

where BLOCK_SIZE is Oracle block size set in SPFile.
Average Leaf Blocks per Key: 1
Clustering Factor: Ceiling (Number of Rows*Selectivity)
Average Data Blocks per Key: Ceiling (Clustering Factor/Distinct Keys)
Number of Rows: Given by a developer who requests schema change. (Same with Number of Rows in Table Statistics)
Inversion Entry Index Consists of Only Nullable Columns (Non-Unique Index)
B-Level:
  Floor($Log_{100}$ Cardinality) Note: $Log_{100}$ means Log base 100)
Number of Distinct Keys: Cardinality Number of Leaf Blocks:

$$Ceiling([Cardinality/Ceiling\{BLOCK\_SIZE/(Sum\ of \\ related\ columns'\ Average\ Column\ Length+ \\ 22)\}]*1.5)$$

where BLOCK_SIZE is Oracle block size set in SPFile.
Average Leaf Blocks per Key: 1
Clustering Factor: Ceiling (Cardinality*0.95)
Average Data Blocks per Key: Ceiling (Number or Rows/Clustering Factor)
Number of Rows: Cardinality
Inversion Entry Index Consists of System Mod Time Stamp Column and Others (Non-Unique Index)
B-Level:
Floor($Log_{100}$ Number of Rows) Note: $Log_{100}$ means Log base 100)
Number of Distinct Keys: Ceiling(Number of Rows*0.95)
Number of Leaf Blocks:

$$Ceiling([Number\ of\ Rows/Ceiling\{BLOCK\_SIZE/ \\ (Sum\ of\ related\ columns'\ Average\ Column \\ Length+22)\}]*2.5)$$

where BLOCK_SIZE is Oracle block size set in SPFile.
Average Leaf Blocks per Key: 1
Clustering Factor: Ceiling (Number of Rows*0.8)
Average Data Blocks per Key: Ceiling ($Log_{in}$ Number of Leaf Blocks)*(1.0/0.8)
Number of Rows: Given by a developer who requests schema change. (Same with Number of Rows in Table Statistics)

In one embodiment, there are 30 types of columns with respect to Oracle Statistics. In one embodiment, priority is decided based on the following order. First 29 types are special cases. Thus, it will vary as the system optimizes values.
1. Table's ID Column
  Number of Distinct Count: Given by a developer who requests schema change. (Same with Number of Rows in Table Statistics)
  Number of Null Count: 0 (Zero)
  Average Column Length: SIZE of ID
2. Organization ID Column (Multi-Tenancy Filter)
  Number of Distinct Count: 2000 (We assume that one instance (pod) has about 2000 organization)
  Number of Null Count: 0 (Zero)
  Average Column Length: SIZE of ID
3. Created or Last Updated By Column
  Number of Distinct Count: NUMBER_OF_ORGS_PER_INSTANCE*5 (but if Number of Rows is smaller than this value result, this value will be Number of Rows/5)
  Number of Null Count: 0 (Zero)
  Average Column Length: SIZE of ID
4. Created or Last Update Time Stamp Column
  Number of Distinct Count: Number of Rows*0.8 (80%)
  Number of Null Count: 0 (Zero)
  Average Column Length: SIZE of DATE 5. System Mod Time Stamp Column
Number of Distinct Count: Number of Rows*0.95 (95%)
Number of Null Count: 0 (Zero)
Average Column Length: SIZE of DATE 6. Date Column
Number of Distinct Count:
   If Column is nullable—Number of Rows*0.1
   If Column is not nullable—Number of Rows*0.5
Number of Null Count: ads
   If Column is nullable—Number of Rows*0.5
   If Column is not nullable—0 (Zero)
Average Column Length:
   If Column is nullable—2
   If Column is not nullable—8

7. Boolean Column
   Number of Distinct Count: 2
   Number of Null Count: 0
   Average Column Length: 2

8. Server ID Column (Corresponding to Number of Instances)
Number of Distinct Count: 50
Number of Null Count: 0
Average Column Length: 2

9. Referencing Enum or ID Column
Number of Distinct Count:
   If Column is nullable—Number of Rows*0.05
   If Column is not nullable—Number of Rows*0.6
Number of Null Count:
   If Column is Nullable—Number of Rows*0.8
   If Column is not nullable—0 (Zero)
Average Column Length:
   If Column is nullable—Ceiling(Column Definition Length*0.05)
   If Column is not nullable—Ceiling(Column Definition Length*0.15)
     Note: Column Definition Length means defined size of column in Byte 10. Foreign Key Column
Number of Distinct Count:
   If Column is nullable—Number of Rows*0.15
   If Column is not nullable—Number of Rows*0.4
Number of Null Count:
   If Column is nullable—Number of Rows*0.75
   If Column is not nullable—0 (Zero)
Average Column Length:
   If Column is nullable—3
   If Column is not nullable—16

11. Developer Name Column (Custom Entity/Field name column)
Number of Distinct Count:
   If Column is Nullable—Number of Rows*0.05
   If Column is not nullable—Number of Rows*0.6
Number of Null Count:
   If Column is Nullable—Number of Rows*0.92
   If Column is not nullable—0 (Zero)
Average Column Length:
   If Column is nullable—Ceiling(Column Definition Length*0.05)
   If Column is not nullable—Ceiling(Column Definition Length*0.15)
     Note: Column Definition Length means defined size of column in Byte 12. Language Column
Number of Distinct Count:
   If Column is Nullable—Number of Rows*0.01
   If Column is not nullable—Number of Rows*0.015
     Note: Both cannot be greater than 250
Number of Null Count:
   If Column is Nullable—Number of Rows*0.7
   If Column is not nullable—0 (Zero)
Average Column Length:
   if (the column name contains "_ID")
     If Column is Nullable—5
     If Column is not nullable—SIZE of ID
   if (the column name contains "_KEY")
     If Column is Nullable–1
     If Column is not nullable—3
   if (the column name contains "_ID")
     If Column is Nullable—3
     If Column is not nullable—8 (Average length of language names)

13. STDxxx or VALxxx (Xxx Indicates Numbers: i.e., STD0, STD10, STD555)
Number of Distinct Count: Number of Rows*0.5
Number of Null Count: 100
Average Column Length: 10

14. API Version Column
Number of Distinct Count: 50
Number of Null Count:
   If Column is Nullable—Number of Rows*0.95
   If Column is not nullable—0 (Zero)
Average Column Length:
   If Column is Nullable–1
   If Column is not nullable—4

15. Key Prefix Column
Number of Distinct Count: 300
Number of Null Count:
   If Column is Nullable—Number of Rows*0.8
   If Column is not nullable—0 (Zero)
Average Column Length:
   If Column is Nullable—1
   If Column is not nullable—4

16. Currency ISO Code Column
Number of Distinct Count: 60
Number of Null Count:
   If Column is Nullable—Number of Rows*0.95
   If Column is not nullable—0 (Zero)
Average Column Length:
   If Column is Nullable—1
   If Column is not nullable—4

17. Namespace Column
Number of Distinct Count:
   If Column is Nullable—Number of Rows*0.05
   If Column is not nullable—Number of Rows*0.2
Number of Null Count:
   If Column is Nullable—Number of Rows*0.85
   If Column is not nullable—0 (Zero)
Average Column Length:
   If Column is Nullable—Number of Rows*0.1
   If Column is not nullable—Number of Rows*0.2

18. Enum Column
Number of Distinct Count: 10
Number of Null Count:
   If Column is Nullable—Number of Rows*0.5
   If Column is not nullable—0 (Zero)
Average Column Length:
   If Column is Nullable—2
   If Column is not nullable—3

19. Bit Vector Column
Number of Distinct Count: 100
Number of Null Count:
   If Column is Nullable—Number of Rows*0.8
   If Column is not nullable—0 (Zero)

Average Column Length:
  If Column is Nullable—2
  If Column is not nullable—7

20. Version Column
Number of Distinct Count:
  If data type is defined CHAR(15)
    If Column is Nullable—Number of Rows*0.05
    If Column is not nullable—Number of Rows*0.3
  Otherwise,
    If Column is Nullable—10
    If Column is not nullable—100
Number of Null Count:
  If Column is Nullable—Number of Rows*0.9
  If Column is not nullable—0 (Zero)
Average Column Length:
  If data type is defined CHAR(15)
    16 regardless of nullable or not.
  Otherwise,
    If Column is Nullable—2
    If Column is not nullable—4

21. City Column
Number of Distinct Count:
  If Column is Nullable—Number of Rows*0.005
  If Column is not nullable—Number of Rows*0.015
Number of Null Count:
  If Column is Nullable—Number of Rows*0.7
  If Column is not nullable—0 (Zero)
Average Column Length:
  If Column is Nullable—3
  If Column is not nullable—10

22. Country Column
Number of Distinct Count:
  If Column is Nullable—Number of Rows*0.001
  If Column is not nullable—Number of Rows*0.015
Number of Null Count:
  If Column is Nullable—Number of Rows*0.7
  If Column is not nullable—0 (Zero)
Average Column Length:
  If Column is Nullable—3
  If Column is not nullable—7

23. State Column
Number of Distinct Count:
  If Column is Nullable—Number of Rows*0.005
  If Column is not nullable—Number of Rows*0.01
Number of Null Count:
  If Column is Nullable—Number of Rows*0.7
  If Column is not nullable—0 (Zero)
Average Column Length:
  If Column is Nullable—3
  If Column is not nullable—9

24. Street Column
Number of Distinct Count:
  If Column is Nullable—Number of Rows/3
  If Column is not nullable—Number of Rows*0.8
Number of Null Count:
  If Column is Nullable—Number of Rows/3
  If Column is not nullable—0 (Zero)
Average Column Length:
  If Column is Nullable—14
  If Column is not nullable—21

25. PostalCode Column
Number of Distinct Count:
  If Column is Nullable—Number of Rows*0.01
  If Column is not nullable—Number of Rows*0.03
Number of Null Count:
  If Column is Nullable—Number of Rows*0.7
  If Column is not nullable—0 (Zero)
Average Column Length:
  If Column is Nullable—3
  If Column is not nullable—7

26. Country/Region Code Column
Number of Distinct Count:
  If Column is Nullable—Number of Rows*0.01
  If Column is not nullable—Number of Rows*0.015
Number of Null Count:
  If Column is Nullable—Number of Rows*0.7
  If Column is not nullable—0 (Zero)
Average Column Length:
  If Column is Nullable—1
  If Column is not nullable—3

27. Hash Column
Number of Distinct Count:
  If Column is Nullable—Number of Rows*0.1
  If Column is not nullable—Number of Rows
Number of Null Count:
  If Column is Nullable—Number of Rows*0.9
  If Column is not nullable—0 (Zero)
Average Column Length:
  If Column is nullable—Ceiling(Column Definition Length*0.1)
  If Column is not nullable—Column Definition Length
    Note: Column Definition Length means defined size of column in Byte 28. Code Column
Number of Distinct Count:
  If Column is Nullable—Number of Rows*0.5
  If Column is not nullable—100
    Note: This value cannot be greater than 100
Number of Null Count:
  If Column is Nullable—Number of Rows*0.85
  If Column is not nullable—0 (Zero)
Average Column Length:
  If Column Definition Length is greater than 22 byte and less than or equals to 120
    If Column is Nullable—Column Definition Length*0.1
    If Column is not nullable—Column Definition Length*0.2
  If Column Definition Length is greater than or equals to 120
    If Column is Nullable—Column Definition Length*0.05
    If Column is not nullable—Column Definition Length*0.1
  Note: In any cases, this value cannot be greater than 6

29. LOB Columns (BLOB and CLOB)
Number of Distinct Count:
  If Column is Nullable—Number of Rows*0.05
  If Column is not nullable—Number of Rows*0.75
Number of Null Count:
  If Column is Nullable—Number of Rows*0.95
  If Column is not nullable—0 (Zero)
Average Column Length:
  If Column is Nullable—100
  If Column is not nullable—1500

30. All Other Types of Columns (Main Algorithm for Columns is in the Type)
Number of Distinct Count:
  If Column is Nullable—Number of Rows*[Selectivity Score*(0.2/100)]
  If Column is not nullable—Number of Rows*[Selectivity Score*(0.9/100)]

Number of Null Count:
  If Column is Nullable—Number of Rows*(A/100) where A is "(100−selectivity Score)*1.2" but A cannot be greater than 95
  If Column is not nullable—0 (Zero)
Average Column Length:
  Let's define Factor=(Number of Rows−Null Count)/Number of Rows
  If Data type is CHAR
    If Column is Nullable—Floor(Column Definition Length+1)*Factor+1
    If Column is not nullable—Column Definition Length+1
  If Data type is VARCHAR2
    If Column is Nullable—Floor[{(Column Definition Length*0.1)+1}*Factor]+1
    If Column is not nullable—Column Definition Length
  If Data type is NUMBER
    If Column is Nullable—2
    If Column is not nullable—4
  If Data type is DATE
    If Column is Nullable—Floor (SIZE_OF_DATE*Factor)+1 L (where SIZE_OF_DATE is 8)
    If Column is not nullable—SIZE_OF_DATE (where SIZE_OF_DATE is 8)
  If Data type is FLOAT
    If Column is Nullable—3
    If Column is not nullable—9
  If Data type is RAW
    If Column is Nullable—Floor(Column Definition Length*Factor)+1
    If Column is not nullable—Column Definition Length
      Note: Column Definition Length cannot be greater than 100. If Column Definition Length is greater than 100, Column Definition Length will be 100 regardless of actual defined size.
  Otherwise
    If Column is Nullable—Floor{Floor(Column Definition Length*0.1)*Factor}+1
    If Column is not nullable—Floor(Column Definition Length*0.1)
Selectivity Score (Related indexes on the column might be good clue of the selectivity)
This score's default value is 2 out of 100
If the column is part of PK index, it will get 70 extra points
If the column is part of AK index, it will get 25 extra points
If the column is part of IE index, it will get 10 extra points.
However, maximum possible score is 90 out of 100

Figure 2:
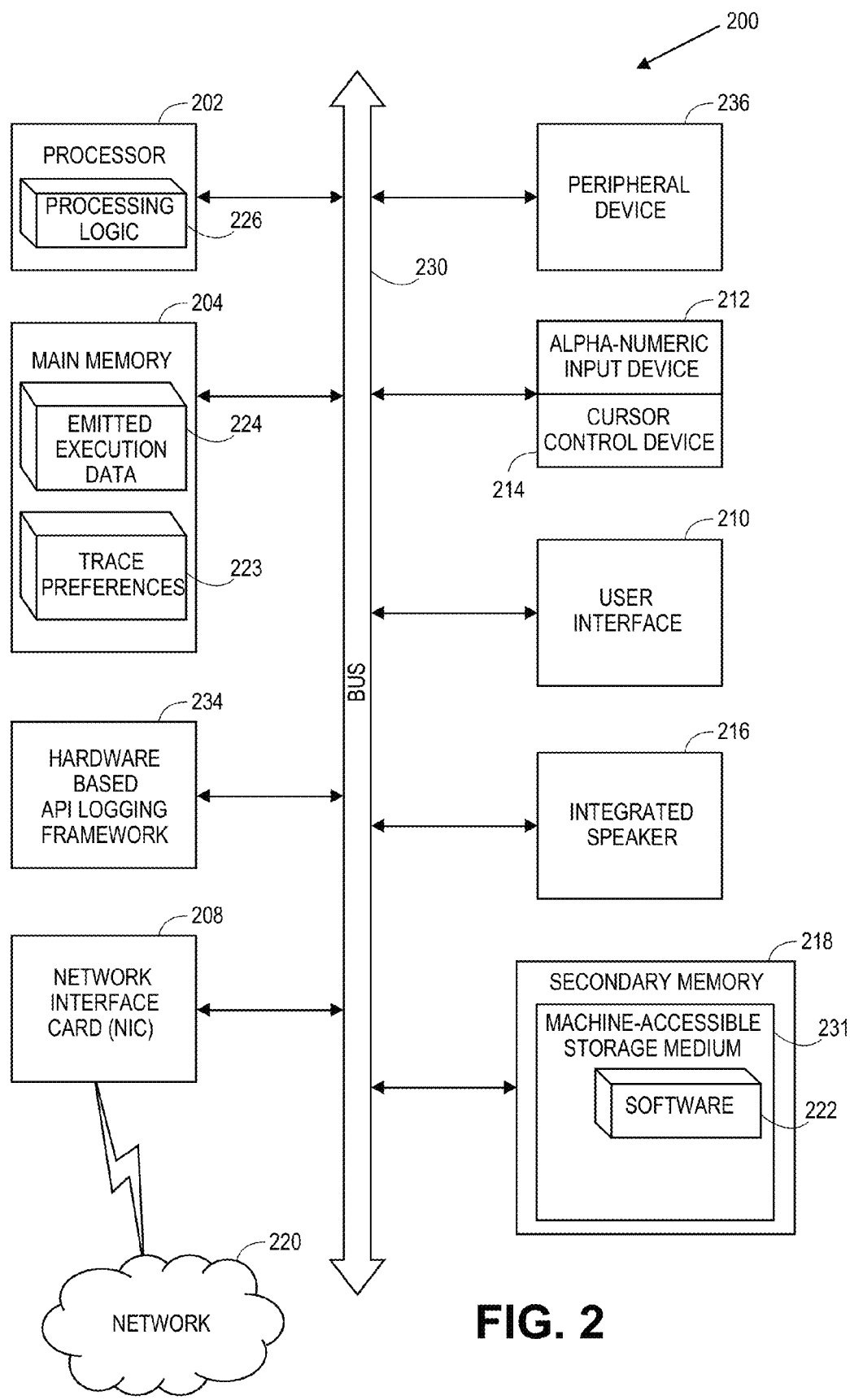
FIG. 2 is a block diagram of one embodiment of a computer system.

FIG. 2 illustrates a diagrammatic representation of a machine 200 in the exemplary form of a computer system, in accordance with one embodiment, within which a set of instructions, for causing the machine 200 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 200 includes a processor 202, a main memory 204 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 218 (e.g., a persistent storage device including hard disk drives and persistent multi-tenant data base implementations), which communicate with each other via a bus 230. Main memory 204 includes emitted execution data 224 (e.g., data emitted by a logging framework) and one or more trace preferences 223 which operate in conjunction with processing logic 226 and processor 202 to perform the methodologies discussed herein.

Processor 202 represents one or more general-purpose processing devices such as a microprocessor, central processing unit, or the like. More particularly, the processor 202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 202 may also be one or more special-purpose processing devices such as an application specific integrated circuit (ASIC), a field programmable gate array (FPGA), a digital signal processor (DSP), network processor, or the like.

The computer system 200 may further include a network interface card 208. The computer system 200 also may include a user interface 210 (such as a video display unit, a liquid crystal display (LCD), or a cathode ray tube (CRT)), an alphanumeric input device 212 (e.g., a keyboard), a cursor control device 214 (e.g., a mouse), and a signal generation device 216 (e.g., an integrated speaker). The computer system 200 may further include peripheral device 236 (e.g., wireless or wired communication devices, memory devices, storage devices, audio processing devices, video processing devices, etc. The computer system 200 may further include a Hardware based API logging framework 234 capable of executing incoming requests for services and emitting execution data responsive to the fulfillment of such incoming requests.

The secondary memory 218 may include a machine-readable storage medium (or more specifically a machine-accessible storage medium) 231 on which is stored one or more sets of instructions (e.g., software 222) embodying any one or more of the methodologies or functions of dynamic adaptive configuration management database systems described herein. The software 222 may also reside, completely or at least partially, within the main memory 204 and/or within the processor 202 during execution thereof by the computer system 200, the main memory 204 and the processor 202 also constituting machine-readable storage media. The software 222 may further be transmitted or received over a network 220 via the network interface card 208. The machine-readable storage medium 231 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 3:
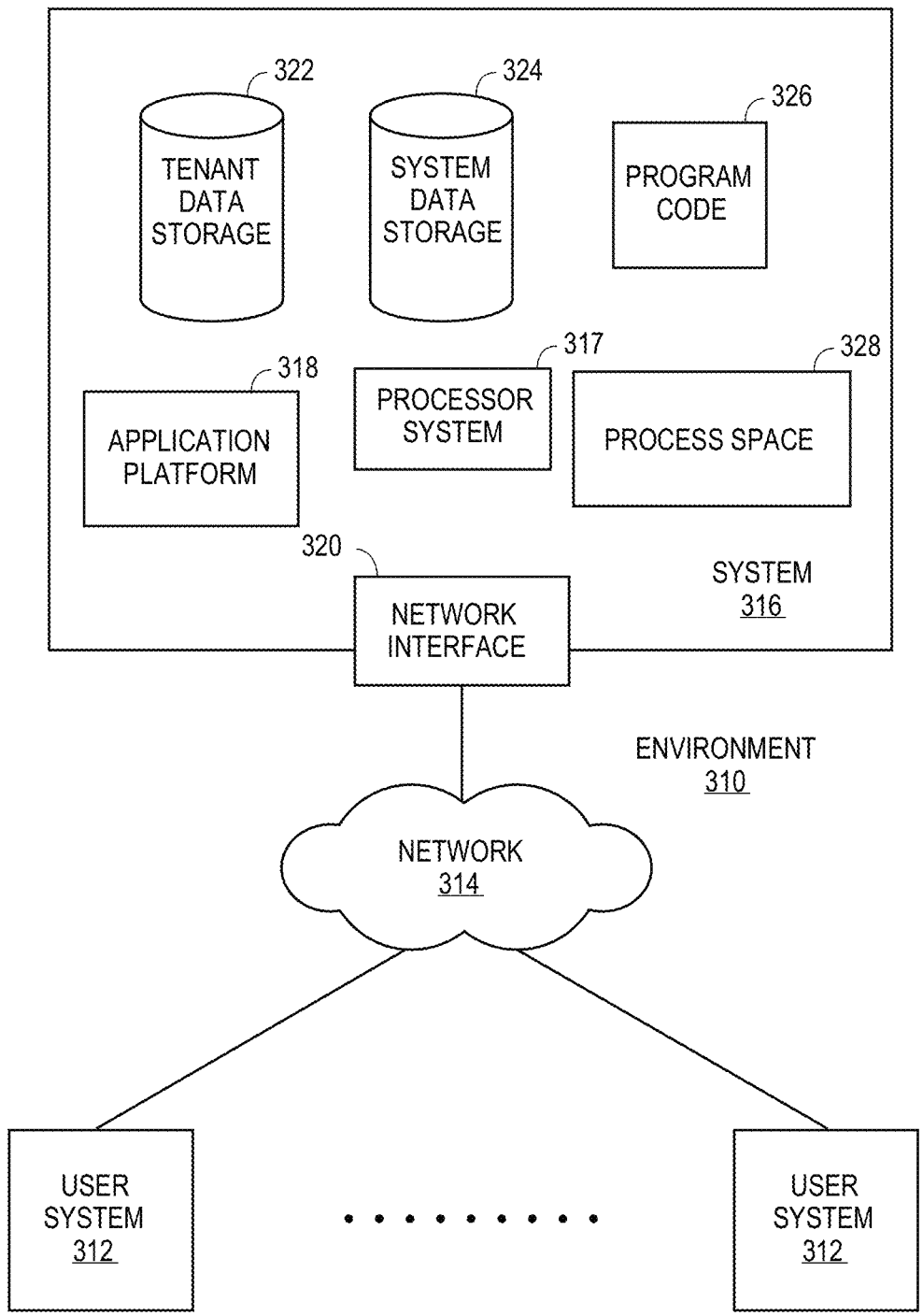
FIG. 3 is a block diagram of one environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in herein FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internet-work of networks often referred to as the "Internet" with a capital "I," that network will be used in many of the examples herein. However, it should be understood that the networks that one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
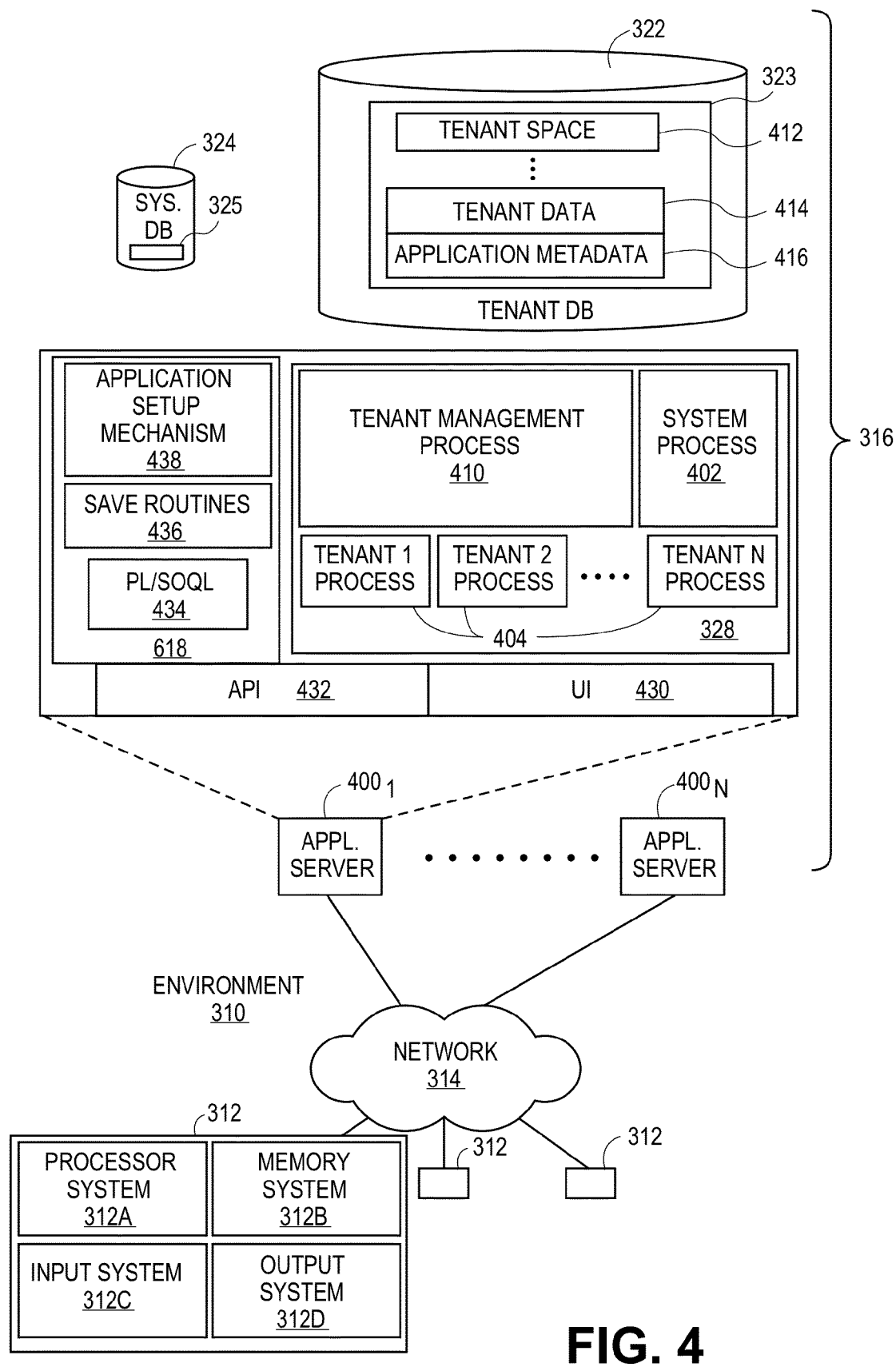
FIG. 4 is a block diagram of one embodiment of elements of environment of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   maintaining a master statistics file in a multitenant environment, the master statistics file having statistics corresponding to multiple tenants within the multitenant environment;
   parsing the master statistics file into an object having an ordered grouping of statistical information corresponding to one or more selected tables stored in a single database within the multitenant environment;
   generating statistics for a table, the table corresponding to a selected tenant of the multitenant environment, the table from the one or more selected tables; and
   updating the master statistics file based on the generated statistics for the table.

2. The method of claim 1 wherein generating statistics for the selected table comprises:
   determining a total number of rows in the selected table;
   determining a number of disk blocks the selected table uses; and
   determining an average length of rows in the selected table.

3. The method of claim 1 wherein generating statistics for the selected table comprises, for an index within the selected table:
   determining a number of rows in the index;
   determining a number of leaf blocks for the index; and
   determining a number of distinct keys for the index.

4. The method of claim 3 wherein generating statistics for the selected table further comprises:
   determining an average number of leaf blocks per key;
   determining an average number of data blocks per key;
   determining a clustering factor; and
   determining a B-tree level.

5. The method of claim 1 wherein generating statistics for the selected table comprises:
   determining a number of distinct keys for one or more columns within the selected table;
   determining a number of nulls in the one or more columns within the selected table; and
   determining an average column length for the selected table.

6. The method of claim 5 wherein generating statistics for the selected table further comprises:
   determining a highest value for one or more columns within the selected table; and
   determining a lowest value for one or more columns within the selected table.

7. An apparatus comprising:
   means for maintaining a master statistics file in a multitenant environment, the master statistics file having statistics corresponding to multiple tenants within the multitenant environment;
   means for parsing the master statistics file into an object having an ordered grouping of statistical information corresponding to one or more selected tables stored in a single database within the multitenant environment;
   means for generating statistics for a table, the table corresponding to a selected tenant of the multitenant environment, the table from the one or more selected tables; and
   means for updating the master statistics file based on the generated statistics for the table.

8. The apparatus of claim 7 wherein the statistics for the selected table comprises:
   a total number of rows in the selected table;
   a number of disk blocks the selected table uses; and
   an average length of rows in the selected table.

9. The apparatus of claim 7 wherein the statistics for the selected table comprises, for an index within the selected table comprises:
   a number of rows in the index;
   a number of leaf blocks for the index; and
   a number of distinct keys for the index.

10. The apparatus of claim 9 wherein the statistics for the selected table further comprises:
    an average number of leaf blocks per key;
    an average number of data blocks per key;
    a clustering factor; and
    a B-tree level.

11. The apparatus of claim 7 wherein the statistics for the selected table comprises:
   a number of distinct keys for one or more columns within the selected table;
   a number of nulls in the one or more columns within the selected table; and
   an average column length for the selected table.

12. The apparatus of claim 11 wherein the statistics for the selected table further comprise:
   a highest value for one or more columns within the selected table; and
   a lowest value for one or more columns within the selected table.

13. A system comprising:
   one or more user computing systems;
   a server computing system communicatively coupled with the one or more user computing systems via a network, the server computing system to provide a multitenant environment, wherein the multitenant environment includes data for multiple client entities, each identified by a tenant identifier (ID) having one of one or more users associated with the tenant ID, users of each of multiple client identities can only access data identified by a tenant ID associated with the respective client entity, and the multitenant environment is at least a hosted database provided by an entity separate from the client entities, and provides on-demand database service to the client entities, the server system further to
   maintain a master statistics file in a multitenant environment, the master statistics file having statistics corresponding to multiple tenants within the multitenant environment;
   parse the master statistics file into an object having an ordered grouping of statistical information corresponding to one or more selected tables stored in a single database within the multitenant environment;
   generate statistics for a table, the table corresponding to a selected tenant of the multitenant environment, the table from the one or more selected tables; and
   update the master statistics file based on the generated statistics for the table.

14. The system of claim 13 wherein the statistics for the selected table comprises:
   a total number of rows in the selected table;
   a number of disk blocks the selected table uses; and
   an average length of rows in the selected table.

15. The system of claim 13 wherein the statistics for the selected table comprises, for an index within the selected table comprises:
   a number of rows in the index;
   a number of leaf blocks for the index; and
   a number of distinct keys for the index.

16. The system of claim 15 wherein the statistics for the selected table further comprises:
   an average number of leaf blocks per key;
   an average number of data blocks per key;
   a clustering factor; and
   a B-tree level.

17. The system of claim 13 wherein the statistics for the selected table comprises:
   a number of distinct keys for one or more columns within the selected table;
   a number of nulls in the one or more columns within the selected table; and
   an average column length for the selected table.

18. The system of claim 17 wherein the statistics for the selected table further comprise:
   a highest value for one or more columns within the selected table; and
   a lowest value for one or more columns within the selected table.

* * * * *